United States Patent [19]

Donegan

[11] Patent Number: 4,589,922
[45] Date of Patent: May 20, 1986

[54] FLUIDIZED PIGMENT PRESSCAKE

[75] Inventor: Thomas E. Donegan, Holland, Mich.

[73] Assignee: BASF Wyandotte Corporation, Wyandotte, Mich.

[21] Appl. No.: 555,277

[22] Filed: Nov. 25, 1983

[51] Int. Cl.$^4$ .......................... C09B 56/14; C09D 3/40
[52] U.S. Cl. ............................ 106/308 Q; 106/288 Q; 106/309; 106/30
[58] Field of Search ............... 106/288 Q, 308 Q, 309, 106/30

[56] References Cited

U.S. PATENT DOCUMENTS 4,036,652  7/1977  Rothmayer ..................... 106/308 N

OTHER PUBLICATIONS

Chemical Abstracts, vol. 90, Abstract No. 205876v, Moroz et al., Dispersability of Modified Polyhalogenated Phthalocyanine Pigments, 1979.
Chemical Abstracts, vol. 91, Abstract No. 124950h, Aristov et al., Effect of Rosin Soap Adsorption on the Technological Properties of Phthalocyanine Pigments, 1979.

Primary Examiner—Paul Lieberman
Assistant Examiner—Amelia B. Yarbrough
Attorney, Agent, or Firm—Bernhard R. Swick

[57] ABSTRACT

In accordance with the instant invention, a high solids phthalocyanine pigment presscake prepared by methods well known to those skilled in the art is fluidized. The fluidization process comprises the steps of mixing the high solids pigment presscake with alkali metal hydroxide or ammonium hydroxide and rosin. In a preffered embodiment, the rosin, is dissolved in the hydroxide or aqueous solution thereof prior to mixing with the presscake.

11 Claims, No Drawings

FLUIDIZED PIGMENT PRESSCAKE

BACKGROUND OF THE INVENTION

1. Field of the Invention

This invention relates to easily dispersible pigments. More specifically, it relates to a process for rendering a high solids pigment presscake into a more fluid form by the addition of resins and to pigment dispersions prepared by this process.

2. Current Practice

In the preparation of inks, paints, colored plastics, and the like, it is essential that the pigment be uniformly dispersed in the vehicle. There are many techniques for improving dispersibility of pigments such as adding the pigment in the form of a fine powder. However, powdered pigments are difficult to redisperse to obtain maximum dispersion.

While pigment presscake disperses more readily in a water flexo ink than dry pigment powders, nevertheless, due to the low solids content of the aqueous cake generally obtained by conventional processes, dispersion of untreated presscake in water flexo inks is not economically feasible because of the low pigment loading. Methods for preparing high solids presscakes from the conventional presscake obtained from a filter press are known to those skilled in the art. Such high solids presscakes allow for high pigment loading and are readily dispersible in water flexo inks but are difficult to handle and particularly are not readily pumpable. Accordingly, it is desirable to be able to fluidize the high solids pigment presscake for ease of handling. Thus, it is a purpose of this invention to fluidize pigment presscakes for ease of handling and to achieve improved dispersion and excellent color properties.

| Prior Patents of Interest | | | |
|---|---|---|---|
| U.S. Pat. No. | Issued | Inventor(s) | Assignee |
| U.S. Pat. No. 4,036,652 | 7/19/77 | Rothmayer | Sun Chemical |
| U.S. Pat. No. 3,945,843 | 3/23/76 | Holty et al | Nalco |
| U.S. Pat. No. 4,230,610 | 10/28/80 | Falcione et al | Calgon |
| European 0050313A1 | 4/28/82 | Deubel et al | Hoechst |

SUMMARY OF THE INVENTION

In accordance with the instant invention, a high solids phthalocyanine pigment presscake, prepared by methods well known to those skilled in the art, is fluidized. The fluidization process comprises the steps of mixing the high solids pigment presscake with alkali metal hydroxide or ammonium hydroxide and rosin. In a preferred embodiment, the rosin, is dissolved in the hydroxide or aqueous solution thereof prior to mixing with the presscake.

DESCRIPTION OF THE PREFERRED EMBODIMENTS

In accordance with the instant invention, a superior fluidized high solids presscake product is produced by a novel process that comprises:

1. preparing a high solids pigment presscake by any known method from a conventional presscake which generally will contain about 15 to 30 percent of pigment by, for example, evaporating or vacuuming off water. The resulting presscake contains about 40 to 55 percent pigment and about 45 to 60 percent water.

2. mixing the resulting high solids pigment presscake with rosin. The rosin may be wood rosin, including dimerized wood rosin and hydrogenated wood rosin, gum rosin or tall oil rosin. Such products are available commercially under the names, Pentalyn 856, Dymerex and Staybelite from Hercules Corp., Unirez 705 from Union Camp Corp., SM 705 from the St. Johns Co., WW Rosin from the Filtered Rosin Products Co. and F.F. Rosin from the George Morse and Sons Co.

It has been found that the rosins as set forth above are particularly and unusually effective with phthalocyanine pigments including both phthalocyanine blue and phthalocyanine green pigments. The rosin is preferably dissolved in an alkali metal hydroxide or ammonium hydroxide. The preferred alkali metal hydroxides are sodium hydroxide and potassium hydroxide.

Generally, the ratio of rosin to pigment is about 3.0 to 10.0 parts of rosin per 100 parts of pigment and preferably about 3.0 to 7.0 parts per 100 parts of pigment. The amount of the hydroxide compound is determined by the amount required to completely dissolve the rosin and bears a relationship to the acid number of the rosin. In general, the amount of the hydroxide compound is about 0.25 to 1.25 parts per 100 parts of pigment. Preferably the hydroxide compound is added in the form of an aqueous solution of about 3.0 to 10.0 percent hydroxide compound, balance water. It is preferred that the rosin be first dissolved in the hydroxide compound or aqueous solution thereof and then mixed with the presscake. The product is a fluidized phthalocyanine pigment presscake comprising by weight about 35 to 55 percent pigment, about 3.0 to 10.0 percent of the saponified rosin and about 40 to 60 percent water. The fluidized pigment requires no post treatment before use. It is easily dispersible in water or solvent based ink systems, particularly water flexo inks.

The pigment presscake may also contain up to about 1.0 part by weight, preferably about 0.5 to 0.75 parts by weight, of an antifoam agent per 100 parts by weight pigment. This may be any antifoam agent which minimizes foam production. Suitable antifoam agents are conventional silicone antifoam agents, aliphatic alcohols of 10 carbons or more, organic phosphates and phthalates, conventional nonionic synthetic detergents such as the polyoxyalkylene, particularly ethylene oxide adducts of hydrophobic bases, etc., having the desired properties. In general, the amount of ethylene oxide in the ethylene oxide adducts is less than 20 percent of the weight of the hydrophobic base. Such polyoxy alkylene compositions are described in U.S. Pat. Nos. 2,674,619, 2,979,528 and 2,425,755.

The mixing step may be performed in any conventional high shear mixing equipment such as a Cowles dissolver or a single blade mixer, a Banberry mill or a Gaulin homogenizer. The process can be carried out at any suitable temperature and pressure generally at ambient temperature and pressure and, in any event, within the range of about 0° to 100° C. and at atmospheric pressure or under a vacuum. The fluidized pigment presscakes of the instant invention are particularly suited for use in water-based ink systems and particularly water flexo ink systems where they demonstrate ease of dispersibility, gloss, color strength, and transparency that are far superior to conventional dry colors and to unmodified high solids presscakes. They are also suitable for use in aqueous paint systems, textile ink systems, and other aqueous based dispersion systems.

The invention will be further described in the following examples. Unless otherwise indicated throughout this application, all parts and percentages are by weight and all temperatures are in degrees centigrade.

EXAMPLE 1

One hundred parts of a high solids phthalocyanine blue presscake containing about 50 percent pigment and 50 percent water is added to a container equipped with a Cowles dissolver capable of stirring at 2000 rpm. 5.26 parts of dimerized wood rosin is dissolved in 50 parts of water containing 1.05 parts of sodium hydroxide and heated until dissolved. The rosin solution is then added to the presscake in the container where it is agitated until homogeneous. A pourable, high solids dispersion which readily disperses in a water flexo ink is produced. The product exhibits excellent dispersibility in the ink and the ink is characterized by superior gloss, and color strength.

EXAMPLE 2

A fluidized presscake was prepared as described in Example 1 with the exception that 1 percent by weight of an antifoam product sold under the trademark Surfynol 104E, by Air Products and Chemicals, Inc. was added to the presscake long with the sodium hydroxide rosin solution. This antifoam is a 50 percent solution of tetramethyl decynediol in ethylene glycol. The product was characterized by high dispersibility in water flexo inks as well as reduced tendency to foam. The water flexo ink prepared therefrom exhibits excellent gloss and color strength as demonstrated by draw down tests.

EXAMPLE 3

Example 2 is repeated with the exception that a phthalocyanine green pigment is employed in lieu of the phthalocyanine blue pigment. This product is also characterized by high dispersibility in water flexo inks as well as reduced tendency to foam. The water flexo ink prepared therefrom exhibits excellent gloss and color strength.

EXAMPLE 4

A fluidized phthalocyanine blue presscake was prepared as in Example 2 with the exception that hydrogenated wood rosin was substituted for the dimerized wood rosin. The fluidized phthalocyanine presscake was readily dispersible in water flexo ink and water flexo inks prepared therefrom were characterized by excellent gloss and color strength as demonstrated by draw down tests.

EXAMPLE 5

A fluidized phthalocyanine blue presscake was prepared as described in Example 2 with the exception that a fumaric modified rosin ester was substituted for the dimerized wood rosin. The fluidized presscake was characterized by excellent dispersibility in water flexo inks, and the water flexo inks produced thereby were characterized by excellent gloss and color strength as demonstrated by draw down tests.

The embodiments of the invention in which an exclusive privilege or property is claimed are defined as follows:

1. A fluidized high solids phthalocyanine pigment presscake comprising by weight about 35 to 55 percent pigment, about 3.0 to 10.0 percent saponified rosin and about 40 to 60 percent water.

2. The fluidized pigment presscake of claim 1 which also includes about 0.5 to 1.0 parts defoaming agent per 100 parts pigment.

3. The fluidized pigment presscake of claim 1 wherein said rosin is dimerized wood rosin.

4. The fluidized pigment presscake of claim 3 wherein said presscake also includes 0.5 to 1.0 parts defoaming agent per 100 parts pigment.

5. The fluidized pigment presscake of claim 1 wherein said rosin is hydrogenated wood rosin.

6. The fluidized pigment presscake of claim 5 wherein said presscake also includes 0.5 to 1.0 parts defoaming agent per 100 parts pigment.

7. A process of fluidizing a high solids phthalocyanine pigment presscake which contains by weight about 40 to 55 percent pigment and about 45 to 60 percent water comprising the steps of mixing said high solids pigment presscake with alkali metal or ammonium hydroxide and rosin the amount of said rosin being about 3.0 to 10.0 parts by weight per 100 parts by weight of said pigment and the amount of said hydroxide being about 0.25 to 1.25 parts by weight per 100 parts by weight of said pigment.

8. The process of claim 7 wherein said rosin is dissolved in said hydroxide prior to mixing with said presscake.

9. The process of claim 8 wherein a defoaming agent is also added in amount of about 0.5 to 1.0 parts per 100 parts pigment.

10. The process of claim 9 wherein said rosin is dimerized wood rosin.

11. The process of claim 9 wherein said rosin is hydrogenated wood rosin.

* * * * *